United States Patent
Stoppelmann et al.

(10) Patent No.: US 8,604,120 B2
(45) Date of Patent: Dec. 10, 2013

(54) POLYAMIDE MOULDING COMPOUND FOR PRODUCING MOULDED ARTICLES WITH A SOFT-TOUCH SURFACE AND ALSO CORRESPONDING MOULDED ARTICLES

(75) Inventors: Georg Stoppelmann, Bonaduz (CH); Botho Hoffmann, Domat/Ems (CH)

(73) Assignee: EMS-Patent AG, Domat/Ems (CH)

( * ) Notice: Subject to any disclaimer, the term of this patent is extended or adjusted under 35 U.S.C. 154(b) by 223 days.

(21) Appl. No.: 13/186,785

(22) Filed: Jul. 20, 2011

(65) Prior Publication Data

US 2012/0029133 A1 Feb. 2, 2012

(30) Foreign Application Priority Data

Jul. 30, 2010 (EP) .................................. 10007993

(51) Int. Cl.
*C08L 53/00* (2006.01)
*C08K 3/34* (2006.01)

(52) U.S. Cl.
USPC ........................................ 524/505; 524/442

(58) Field of Classification Search
USPC ....................................................... 524/505
See application file for complete search history.

(56) References Cited

U.S. PATENT DOCUMENTS

| | | |
|---|---|---|
| 2,516,585 A | 7/1950 | Pease |
| 3,600,336 A | 8/1971 | Okada et al. |
| 4,036,811 A | 7/1977 | Noetzel et al. |
| 4,076,664 A | 2/1978 | Pagilagan |
| 4,212,777 A | 7/1980 | Goletto |
| 4,345,066 A | 8/1982 | Rüter |
| 4,413,921 A | 11/1983 | Fotiu et al. |
| 4,603,166 A | 7/1986 | Poppe et al. |
| 4,680,379 A | 7/1987 | Coquard et al. |
| 4,731,421 A | 3/1988 | Hoppe et al. |
| 4,826,951 A | 5/1989 | Coquard et al. |
| 4,831,108 A | 5/1989 | Richardson et al. |
| 4,847,356 A | 7/1989 | Hoppe et al. |
| 5,071,924 A | 12/1991 | Koch et al. |
| 5,081,222 A | 1/1992 | Reimann et al. |
| 5,098,940 A | 3/1992 | Brooks |
| 5,177,177 A | 1/1993 | Thullen et al. |
| 5,177,178 A | 1/1993 | Thullen et al. |
| 5,191,060 A | 3/1993 | Akkapeddi et al. |
| RE34,447 E | 11/1993 | Poppe et al. |
| 5,278,231 A | 1/1994 | Chundury |
| 5,302,691 A | 4/1994 | Soelch |
| 5,310,860 A | 5/1994 | Maj et al. |
| 5,342,862 A | 8/1994 | Reich |
| 5,422,418 A | 6/1995 | Maj et al. |
| 5,480,945 A | 1/1996 | Vicik |
| 5,560,398 A | 10/1996 | Pfleger |
| 5,612,446 A | 3/1997 | Presenz et al. |
| 5,674,973 A | 10/1997 | Pipper et al. |
| 5,684,120 A | 11/1997 | Torre |
| 5,686,192 A | 11/1997 | Presenz et al. |
| 5,688,901 A | 11/1997 | Fisch et al. |
| 5,708,125 A | 1/1998 | Liedloff et al. |
| 5,773,556 A | 6/1998 | Kleiner et al. |
| 5,786,086 A | 7/1998 | Frihart et al. |
| 5,807,972 A | 9/1998 | Liedloff et al. |
| 5,917,004 A | 6/1999 | Liedloff et al. |
| 5,957,607 A | 9/1999 | Tsai |
| 6,204,355 B1 | 3/2001 | Dalla Torre et al. |
| 6,255,371 B1 | 7/2001 | Schlosser et al. |
| 6,270,560 B1 | 8/2001 | Kleiner et al. |
| 6,291,633 B1 | 9/2001 | Nakamura |
| 6,303,741 B1 | 10/2001 | Tanaka |
| 6,319,986 B1 | 11/2001 | Amimoto et al. |
| 6,365,071 B1 | 4/2002 | Jenewein et al. |
| 6,547,992 B1 | 4/2003 | Schlosser et al. |
| 6,572,295 B1 | 6/2003 | Chochoy et al. |
| 6,881,477 B2 | 4/2005 | Presenz et al. |
| 6,943,231 B2 | 9/2005 | Bühler |
| 7,014,315 B2 | 3/2006 | Iori et al. |
| 7,217,767 B2 | 5/2007 | Aguirre et al. |
| 7,249,844 B2 | 7/2007 | Sakai |
| 7,258,929 B2 | 8/2007 | Kanda et al. |
| 7,427,430 B2 | 9/2008 | Rhee et al. |
| 7,723,411 B2 | 5/2010 | Schneider |
| 7,807,245 B2 | 10/2010 | Bersted et al. |
| 7,807,742 B2 | 10/2010 | Tanaka et al. |
| 7,811,671 B2 | 10/2010 | Bushelman et al. |
| 7,981,518 B2 | 7/2011 | Sato |
| 8,022,170 B2 | 9/2011 | Hoffmann et al. |

(Continued)

FOREIGN PATENT DOCUMENTS

| | | |
|---|---|---|
| CA | 861620 | 1/1971 |
| CA | 2019904 | 1/1991 |

(Continued)

OTHER PUBLICATIONS

Cramer et al., "Some Isomorphous Copolyamides," *Journal of Polymer Science*, vol. 21, pp. 237-250 (1956).
Dolden, "Structure-property relationships in amorphous polyamides," *Polymer*, vol. 17, pp. 875-892 (1976).
Edgar et al., "The p-Phenylene Linkage in Linear High Polymers: Some Structure-Property Relationships," *Journal of Polymer Science*, vol. 8, No. 1, pp. 1-22 (1952).
Henkel Corporation, "Empol Dimer and Polybasic Acids: Technical Bulletin 114C," (1997).
Levine et al., "Isomorphous Replacement in a Copolyamide System," *Journal of Polymer Science*, Issue XLIX, pp. 241-246 (1961).
Unichema International, "Pripol C36-Dimer Acid,".
Yu et al., "Isomorphous Replacement in a Copolyamide System: Homologs of Adipic and Terephthalic Acids," *Am. Chem. Soc.*, Issue 81, pp. 5361-5365 (1959).

(Continued)

*Primary Examiner* — Hui Chin
(74) *Attorney, Agent, or Firm* — Leydig, Voit & Mayer, Ltd.

(57) ABSTRACT

The invention relates to a polyamide moulding compound for producing moulded articles with a soft-touch surface, the polyamide moulding compound comprising a blend of an amine-terminated, amorphous polyamide and styrene-ethylene/butylene-styrene copolymer and also styrene-ethylene/butylene-styrene copolymer grafted with maleic anhydride. The invention relates furthermore to moulded articles which are produced with this moulding compound and the use thereof.

18 Claims, No Drawings

(56) References Cited

U.S. PATENT DOCUMENTS

| | | |
|---|---|---|
| 8,268,956 B2 | 9/2012 | Bühler et al. |
| 2001/0007888 A1 | 7/2001 | Asano |
| 2003/0018107 A1 | 1/2003 | Heinen et al. |
| 2003/0023008 A1 | 1/2003 | Uchida et al. |
| 2003/0126788 A1 | 7/2003 | Uang et al. |
| 2003/0181585 A1 | 9/2003 | Handlin, Jr. et al. |
| 2003/0235666 A1 | 12/2003 | Bühler |
| 2004/0158028 A1 | 8/2004 | Bühler |
| 2004/0230028 A1 | 11/2004 | Sato et al. |
| 2005/0049339 A1 | 3/2005 | Knop et al. |
| 2005/0101708 A1 | 5/2005 | Knop et al. |
| 2006/0138391 A1 | 6/2006 | Drewes et al. |
| 2006/0235190 A1 | 10/2006 | Hoffmann et al. |
| 2006/0264542 A1 | 11/2006 | Schneider |
| 2007/0072970 A1 | 3/2007 | Schneider |
| 2007/0104971 A1 | 5/2007 | Wursche et al. |
| 2007/0123632 A1 | 5/2007 | Rexin et al. |
| 2007/0172614 A1 | 7/2007 | Lee |
| 2007/0222941 A1 | 9/2007 | Sakai |
| 2007/0270544 A1 | 11/2007 | Bühler et al. |
| 2008/0135720 A1 | 6/2008 | Bühler et al. |
| 2008/0207782 A1 | 8/2008 | Jacobs et al. |
| 2008/0274355 A1* | 11/2008 | Hewel .......................... 428/402 |
| 2009/0127740 A1 | 5/2009 | Kirchner |
| 2009/0247699 A1 | 10/2009 | Buehler et al. |
| 2010/0022742 A1 | 1/2010 | Bühler et al. |
| 2010/0130677 A1 | 5/2010 | Amici et al. |
| 2010/0227122 A1 | 9/2010 | Kumazawa et al. |
| 2010/0279111 A1 | 11/2010 | Philipp et al. |
| 2010/0297373 A1 | 11/2010 | Thullen et al. |
| 2011/0105655 A1 | 5/2011 | Harder et al. |
| 2011/0220667 A1 | 9/2011 | Pfleghar et al. |
| 2012/0237708 A1 | 9/2012 | Caviezel et al. |
| 2012/0321829 A1 | 12/2012 | Bayer et al. |

FOREIGN PATENT DOCUMENTS

| | | |
|---|---|---|
| CH | 280367 | 1/1952 |
| DE | 24 47 727 A1 | 4/1976 |
| DE | 26 42 244 A1 | 3/1977 |
| DE | 36 00 015 A1 | 7/1986 |
| DE | 40 05 894 A1 | 12/1991 |
| DE | 43 29 676 A1 | 3/1994 |
| DE | 195 37 614 A1 | 4/1997 |
| DE | 199 20 276 A1 | 11/2000 |
| DE | 199 33 901 A1 | 2/2001 |
| DE | 102 24 947 A1 | 12/2003 |
| DE | 102 59 048 A1 | 7/2004 |
| DE | 103 16 873 A1 | 11/2004 |
| DE | 103 46 326 A1 | 5/2005 |
| DE | 694 28 832 T3 | 2/2007 |
| EP | 0 196 981 A1 | 10/1986 |
| EP | 0 246 620 A2 | 11/1987 |
| EP | 0 288 269 A1 | 10/1988 |
| EP | 0 299 444 A2 | 1/1989 |
| EP | 0 360 611 A2 | 3/1990 |
| EP | 0 376 616 B1 | 7/1990 |
| EP | 0 410 301 A1 | 1/1991 |
| EP | 0 449 466 A1 | 10/1991 |
| EP | 0 469 435 A1 | 2/1992 |
| EP | 0 508 054 A2 | 10/1992 |
| EP | 0 550 314 A1 | 7/1993 |
| EP | 0 550 315 A1 | 7/1993 |
| EP | 0 659 534 A2 | 6/1995 |
| EP | 0 693 515 A1 | 1/1996 |
| EP | 0 699 708 A2 | 3/1996 |
| EP | 0 792 912 A2 | 9/1997 |
| EP | 0 818 491 A2 | 1/1998 |
| EP | 0 837 087 A1 | 4/1998 |
| EP | 0 771 846 B1 | 1/2002 |
| EP | 1 369 447 A1 | 12/2003 |
| EP | 1 475 403 A1 | 11/2004 |
| EP | 1 548 059 A1 | 6/2005 |
| EP | 1 630 590 A1 | 3/2006 |
| EP | 1 712 581 A1 | 10/2006 |
| EP | 1 752 492 A1 | 2/2007 |
| EP | 1 845 123 A1 | 10/2007 |
| EP | 1 942 296 A1 | 7/2008 |
| EP | 1 972 659 A1 | 9/2008 |
| EP | 2 060 596 A1 | 5/2009 |
| EP | 2 060 607 A1 | 5/2009 |
| EP | 2 082 861 A1 | 7/2009 |
| EP | 1 474 459 B1 | 11/2009 |
| EP | 2 365 033 A1 | 9/2011 |
| GB | 766927 | 1/1957 |
| GB | 1 538 188 A | 1/1979 |
| GB | 1548431 | 7/1979 |
| JP | 54-071191 A | 6/1979 |
| JP | 61-200125 A | 9/1986 |
| JP | 63-023927 A | 2/1988 |
| JP | 02-302440 A | 12/1990 |
| JP | 03-050264 A | 3/1991 |
| JP | 05-125184 A | 5/1993 |
| JP | 06-511281 T | 12/1994 |
| JP | 08-239469 A | 8/1996 |
| JP | 08-259808 | 10/1996 |
| JP | 09-078351 A | 3/1997 |
| JP | 10-168183 A | 6/1998 |
| JP | 10-219026 | 8/1998 |
| JP | 2001-261973 | 9/2001 |
| JP | 2004-083858 | 3/2004 |
| JP | 2006-045390 | 2/2006 |
| WO | WO 90/02017 A1 | 3/1990 |
| WO | WO 92/01389 A1 | 2/1992 |
| WO | WO 92/10525 A1 | 6/1992 |
| WO | WO 94/29367 A1 | 12/1994 |
| WO | WO 95/01389 A1 | 1/1995 |
| WO | WO 97/39053 A1 | 10/1997 |
| WO | WO 99/02606 A1 | 1/1999 |
| WO | WO 01/21698 A1 | 3/2001 |
| WO | WO 02/28953 A1 | 4/2002 |
| WO | WO 02/090421 A2 | 11/2002 |
| WO | WO 2004/055084 A2 | 7/2004 |
| WO | WO 2004/078848 A1 | 9/2004 |
| WO | WO 2004/090036 A1 | 10/2004 |
| WO | WO 2006/74934 A1 | 7/2006 |
| WO | WO 2007/080754 A1 | 7/2007 |
| WO | WO 2007/087896 A1 | 8/2007 |
| WO | WO 2009/062692 A2 | 5/2009 |

OTHER PUBLICATIONS

"Biax, ein neuer Prüfkörper" (BIAX, a new inspection piece), published in Noss'Ovra staff magazine, Dec. 2006, No. 12, 29th year, EMX-CHEMIE AG (4 pgs.).

Laura et al., "Effect of rubber particle size and rubber type on the mechanical properties of glass fiber reinforced, rubber-toughened nylon 6," *Polymer*, vol. 44, No. 11, pp. 3347-3361 (2003).

European Patent Office, European Search Report in European Patent Application No. 10 00 7993 (Nov. 5, 2010).

* cited by examiner

POLYAMIDE MOULDING COMPOUND FOR PRODUCING MOULDED ARTICLES WITH A SOFT-TOUCH SURFACE AND ALSO CORRESPONDING MOULDED ARTICLES

CROSS-REFERENCE TO A RELATED APPLICATION

The present application claims the benefit of European Patent Application Serial No. 10 007 993.8, filed Jul. 30, 2010, the disclosure of which is incorporated by reference.

The invention relates to a polyamide moulding compound for producing moulded articles with a soft-touch surface, the polyamide moulding compound comprising a blend of an amine-terminated, amorphous polyamide and styrene-ethylene/butylene-styrene copolymer and also styrene-ethylene/butylene-styrene copolymer grafted with maleic anhydride. The invention relates furthermore to moulded articles which are produced with this moulding compound and the use thereof.

Moulded articles which have a soft material surface, a so-called soft touch, are known in the state of the art. A soft-touch layer block copolymer composition which is formed from a thermoplastic and block copolymers is known from EP 0 771 846 B1. In the case of the block copolymers, a mixture of styrene-ethylene/butylene-styrene copolymer (SEBS) and an SEBS grafted with maleic anhydride (SEBS-MAH) is proposed. Polyamide 6 and polyamide 66 are mentioned inter alia as thermoplastic. The compositions mentioned in the above-mentioned European patent specification are used for the purpose of producing so-called multilayer moulded articles. In the case of the multilayer moulded article according to EP 0 771 846 B1, the above-described block copolymer composition is applied as a soft-touch layer on a hard and rigid thermoplastic basic body.

A further moulded article which is intended to have a soft-touch surface is described in EP 1 474 459 B1. The moulded articles described there consist of a hydrated block copolymer with a specifically adjusted controlled distribution. Reference is made in EP 1 474 459 B1 that such a block copolymer composition has particularly good adhesion to a hard basic body, e.g. made of polyamide.

The above-described documents now in fact describe a block copolymer composition which leads to a so-called soft-touch surface, however the polymer compositions are not suitable on their own for producing moulded articles which have, in addition to the soft-touch surface, also excellent physical properties, in particular a high modulus of elasticity in tension.

Starting herefrom, it is also the object of the present invention to indicate a new polyamide moulding compound which serves for producing moulded articles with a soft-touch surface. The moulded articles are thereby intended to have, in addition to a high modulus of elasticity in tension, at the same time also good breaking elongation. Furthermore, it is the object of the present invention to provide corresponding moulded articles.

The object is achieved by the characterising features the polyamide moulding compound and by the features of the moulded articles.

According to the invention, the moulding compound for producing moulded articles with a soft-touch surface is distinguished by comprising an amine-terminated, amorphous polyamide as polyamide and at least one styrene block copolymer being contained as plasticiser. The plasticiser is composed of at least one styrene-ethylene/butylene-styrene copolymer (SEBS) and at least one SEBS grafted with maleic anhydride (MAH). Furthermore, the moulding compound according to the invention also comprises reinforcing materials and additives.

It is thereby an essential element of the invention that an amine-terminated, amorphous polyamide is used and that a specific prescribed weight ratio of polyamide to plasticiser in the range of 1.25:0.75 to 0.75:1.25 is maintained.

Provided that these conditions are fulfilled, i.e. that an amine-terminated, amorphous polyamide and the above-mentioned specific plasticiser mixture is used, there can be obtained with the further formulation components, namely with the reinforcing materials and the additives, a moulded article which has not only an excellent soft-touch surface with respect to the haptics and the optical properties but also this moulded article has still at the same time also above-average good results with respect to the modulus of elasticity in tension and the breaking elongation.

It has been shown that, in the case of the polyamide moulding compound according to the invention, it is particularly preferred if a PA 6I/6T, PA 6I/10T, PA MACM14, PA MACM18 and mixtures or copolyamides thereof are used as amine-terminated, amorphous polyamide. Amine-terminated means that the amorphous polyamide has an excess of amino end-groups.

The relative viscosity of the amine-terminated, amorphous polyamide is 1.35 to 1.95, preferably 1.37 to 1.80, particular preferred 1.37 to 1.70, very particularly preferred 1.40 to 1.55, measured in 0.5% by weight of m-cresol solution at 20° C.

The amine-terminated, amorphous polyamide has a content of amino end-groups of at least 150 meq/kg, very particularly preferred of 160 to 300 meq/kg, even more preferred of 180 to 260 meq/kg.

The proportion of isophthalic acid in the polyamide PA 6I/6T is 90 to 57% by mol, preferably 85 to 60, particularly preferred 75 to 60% by mol, very particularly preferred 72 to 63% by mol, the sum of both dicarboxylic acids producing 100% by mol.

The proportion of isophthalic acid in the polyamide PA 6I/10T is at least 50% by mol, preferably 55 to 85, particularly preferred 60 to 80% by mol, the sum of both dicarboxylic acids producing 100% by mol.

In a further alternative embodiment of the polyamide moulding compound according to the invention, the amorphous polyamide is used in a mixture with at least one partially crystalline polyamide. The at least one partially crystalline polyamide is selected from the group consisting of PA 6, PA 66, PA 69, PA 610, PA 612, PA 1010 and PA 66/6. The proportion of partially crystalline polyamide in the mixture of amorphous polyamide and partially crystalline polyamide is at most 30% by weight, preferably 5 to 20% by weight, particularly preferred 10 to 15% by weight.

The relative viscosity of the partially crystalline polyamide is 1.4 to 2.5, preferably 1.45 to 2.2, particularly preferred 1.5 to 1.9, very particularly preferred 1.5 to 1.8, measured in 0.5% by weight of m-cresol solution at 20° C.

Preferably, the partially crystalline polyamide has a content of amino end-groups of at least 40 meq/kg, particularly preferred of at least 45 meq/kg, very particularly preferred of 50 to 90 meq/kg.

In particular a polyamide moulding compound which comprises such an amorphous polyamide, as described above, has emerged as superior in its combination of properties. It is surprising in particular that moulded articles which are produced from the polyamide moulding compound according to the invention have, in addition to a modulus of elasticity in tension of greater than 2,500 MPa, at the same time also very high breaking elongation of greater than 6%.

Preferred weight ratios of polyamide to plasticiser are 1.2:0.80 to 0.80:1.2, particularly preferred 1.15:0.85 to 0.85:1.15 and the weight ratio of 1:1 is very particularly preferred.

It was found further that it is particularly important in the case of the plasticisers themselves if a weight ratio of SEBS to SEBS-MAH of 1:2 to 2:1 is advantageous, preferably 1:1.5 to 1.5:1, particularly preferred 1:1.2 to 1.2:1 and very particularly preferred 1:1. By maintaining these limits, very good results can be achieved with respect to the haptics of the surface.

The styrene-ethylene/butylene-styrene copolymer (SEBS) and the styrene-ethylene/butylene-styrene copolymer (SEBS-MAH) grafted with maleic anhydride (MAH) contain respectively 25 to 35% by weight of styrene.

The SEBS-MAH has a melt volume flow rate (MVR) at 275° C. and a loading of 5 kg of at least 80 ml/10 min, preferably 90 to 200 ml/10 min, particularly preferred 100 to 160 ml/10 min. The content of maleic anhydride in the SEBS-MAH is 1 to 2.2% by weight, preferably 1.3 to 2% by weight, particularly preferred 1.5 to 1.9% by weight.

It emerged as favourable if, in the polyamide moulding compound according to the invention, the blend of at least one polyamide (PA) with at least one styrene block copolymer is contained in a quantity of 55 to 85% by weight, preferably 60 to 80% by weight, particularly preferred 65 to 75% by weight.

It emerged as favourable in addition if the reinforcing material is contained in a quantity of 15 to 45% by weight, preferably 20 to 40% by weight, particularly preferred 25 to 35% by weight and very particularly preferred in a quantity of 30% by weight. It must be stressed in particular, with respect to the reinforcing materials, that glass fibres have proved to be best here.

Short glass fibres (cut glass) or endless glass fibres (rovings) can be used. In the case of the short glass fibre, the length of the fibre is 0.2 to 20 mm, preferably 2 to 12 mm. The glass fibres can be furnished with a suitable size- or adhesive system.

Glass fibres made of all types of glass, such as e.g. A-, C-, D-, E-, M-, S-, R-glass, or any mixtures thereof, can be used. Glass fibres made of E-glass or glass fibres made of mixtures with E-glass or mixtures with E-glass fibres are preferred.

The glass fibres have a cross-section which is round, oval, elliptical, angular or rectangular. Glass fibres with a non-circular cross-section, i.e. with an oval, elliptical, angular or rectangular cross-section, are also termed flat glass fibres.

The form of the glass fibre can be extended or helical.

The glass fibres have a diameter of 5 to 20 µm, preferably of 5 to 15 µm and particularly preferred of 5 to 10 µm.

In the case of flat glass fibres, the aspect ratio, i.e. the ratio of the main cross-sectional axis to the subsidiary cross-sectional axis, is 1.5 to 8, preferably 2 to 6, particularly preferred 3 to 5.

The cross sectional axes of the flat glass fibres are 3 to 40 µm long. Preferably, the length of the subsidiary cross-sectional axis is 3 to 20 µm, particularly preferred 4 to 10 µm and the length of the main cross-sectional axis is 6 to 40 µm, particularly preferred 12 to 30 µm.

The polyamide moulding compound according to the invention comprises furthermore 0.1 to 10% by weight, preferably 0.1 to 5% by weight, very particularly preferred 0.1 to 3% by weight of an additive.

The additives can be added to the polyamide moulding compounds according to the invention as powder or liquid or as a master batch. Preferably in the form of one or more master batches. The carrier of the master batch is thereby selected from the group consisting of polyamide, polyolefin, functionalised polyolefin, ionomer.

In the case of the additives, all additives known from the state of the art per se can be contained for producing polyamide moulding compounds. Preferably, the additive is selected from the group consisting of inorganic stabilisers, organic stabilisers, lubricants, colourants, marking materials, inorganic pigments, organic pigments, IR-absorbers, antistatic agents, antiblocking agents, nucleation agents, crystallisation accelerators, crystallisation inhibitors, condensation catalysts, chain controllers, defoamers, chain-lengthening additives, conductivity additives, carbon black, graphite, carbon nanotubes, mould-release agents, parting agents, optical brighteners, adhesives, metal pigments, metal flakes, metal-coated particles, particle fillers, in particular nanoscale fillers, such as e.g. minerals with a particle size of at most 100 nm, or unmodified or modified, natural or synthetic phyllosilicates or mixtures thereof.

There can be used as stabilisers or age-protecting agents in the blends according to the invention, e.g. antioxidants, antiozonants, light stabilisers, UV-stabilisers, UV-absorbers or UV-blockers.

The particle fillers are selected preferably from the group consisting of talcum, mica, wollastonite, kaolin, ground or precipitated calcium carbonate, glass balls, synthetic layer silicates, natural layer silicates and mixtures hereof. These particle fillers are preferably surface-treated.

In the case of colourants, carbon black is preferred in particular as colourant, very particularly preferred colour black. As a result, black-coloured moulded articles can be produced which have, despite the colouration, in addition to excellent haptic properties, also an excellent modulus of elasticity in tension and high breaking elongation.

The above-described polyamide moulding compounds lead to moulded articles which have the following properties:
  soft-touch
  high surface quality
  high modulus of elasticity in tension and high breaking elongation
  high notch impact strength and/or impact strength.

The modulus of elasticity in tension, in the case of test pieces which are produced with the moulding compound according to the invention, is in the range of 2,500 to 7,500 MPa, preferably 2,800 to 6,000 MPa, particularly preferred 3,100 to 6,000 MPa.

Furthermore, the invention also includes moulded articles which are produced with a moulding compound as described above. The moulded articles are distinguished in particular by having on their own per se very high stability and, at the same time with respect to the surface, a soft-touch surface and good surface quality so that excellent optical and also haptic properties are achieved.

A polyamide moulding compound, as was described above, can be used, thanks to its excellent mechanical properties, both as monomaterial and as surface material in a multilayer composite.

Because of the excellent physical properties, in particular the superior modulus of elasticity in tension, in combination with the breaking elongation, the moulding compound according to the invention is suitable for producing housings, keys, grips and/or gripping surfaces for hand tools, household equipment, sports equipment, furniture components, electrical or electronic components or electrical or electronic devices. The devices concern in particular portable electrical or electronic devices, e.g. pumps, hand tools, garden tools, curling tongs, hair dryers, hair cutting devices, shaving apparatus, depilation devices, measuring devices, infrared keys, mobile telephones, players, laptops, notebooks, netbooks, games consoles, personal digital assistants (PDA), smart phones, storage media (e.g. USB sticks) or combinations thereof.

There is used particularly preferably, an above-described polyamide moulding compound as housings, keys, grips and/or gripping surfaces for portable communications devices, players, storage media or combinations thereof.

For the production of the polyamide moulding compound according to the invention, the components are mixed in the molten state and generally the reinforcing material is metered into the melt via gravimetric metering scales or a side feeder. This takes place on normal compounding machines, such as e.g. single- or twin-screw extruders or screw kneaders. The components are thereby metered individually into the feed or supplied in the form of a dry blend. The polymeric component and the reinforcing material can however also be metered together into the feed.

For dry blend production, the dried granulates and possibly further additives are mixed together. This mixture is homogenised for 10 to 40 minutes by means of a tumble mixer, drum hoop mixer or tumble drier. In order to avoid moisture absorption, this can be effected under a dried protective gas.

The compounding is effected at adjusted cylinder temperatures of 230° C. to 300° C. A vacuum can be applied in front of the nozzle or it can be degassed atmospherically. The melt is discharged in strand form, cooled in the water bath at 10 to 80° C. and subsequently granulated. The granulate is dried for 12 to 24 hours at 80 to 120° C. under nitrogen or in a vacuum to a water content of below 0.1% by weight.

The following measuring specifications are used to test the polyamide moulding compound.

MVR (Melt Volume Flow Rate or Melt Volume Rate):
ISO 1133
granulate
temperature 275° C.
load 5 kg
Modulus of Elasticity in Tension:
ISO 527 with a tensile rate of 1 mm/min
ISO test bar, standard: ISO/CD 3167, Type A1,
170×20/10×4 mm, temperature 23° C.
Tensile Strength and Breaking Elongation:
ISO 527 with a tensile rate of 5 mm/min in the case of reinforced materials
ISO test bar, standard: ISO/CD 3167, Type A1,
170×20/10×4 mm, temperature 23° C.
Impact Strength According to Charpy:
ISO 179/*eU
ISO test bar, standard: ISO/CD 3167, Type B1
80×10×4 mm, temperature 23° C.
*1=non-instrumented, 2=instrumented
Notch Impact Strength According to Charpy:
ISO 179/*eA
ISO test bar, standard: ISO/CD 3167, Type B1
80×10×4 mm, temperature 23° C.
*1=non-instrumented, 2=instrumented
Relative Viscosity
ISO 307
0.5% by weight of m-cresol solution
temperature 20° C.
calculation of the relative viscosity (RV) according to $RV=t/t_0$
following section 11 of the standard.
End-Group Determination For the determination of the amino end-groups, the polyamide is dissolved hot in m-cresol and mixed with isopropanol. The content of amino end-groups is determined by potentiometric titration with perchloric acid.

For determination of the carboxyl end-groups, the polyamide is dissolved hot in benzyl alcohol. The content of carboxyl end-groups is determined by potentiometric titration with a tetra-n-butyl-ammonium hydroxide solution.

The test pieces were produced on an injection moulding machine from the Arburg company, model Allrounder 420 C 1000-250. Cylinder temperatures between 265 and 280° C. were thereby used. The mould temperature was 80° C.

If the test pieces are used in the dry state, they are stored after the injection moulding for at least 48 h at room temperature in dry surroundings, i.e. over silica gel.

Production Example for the Polyamide Moulding Compounds

The moulding compounds were produced on a twin-screw extruder from the company Werner & Pfleiderer type ZSK 25. For the dry blend production, the dried granulates (polyamide, SEBS, SEBS-MAH and possibly carbon black master batch) were mixed together. This mixture was homogenised for 30 minutes by means of a tumble mixer. The dry blend was metered into the feed via scales. The glass fibre was conveyed into the polymer melt via a side feeder in 6 housing units in front of the nozzle.

The temperature of the first housing was adjusted to 80° C., that of the remaining housings increasing from 230 to 280° C. A speed of rotation of 200 rpm and a throughput of 12 kg/h was used and atmospherically degassed. The strands were cooled in the water bath, cut and the obtained granulate was dried at 110° for 24 h to a water content below 0.1% by weight.

The invention is explained subsequently in more detail with reference to Tables 1 to 4.

Tables 1 and 2 contain the exact designation of the components and also an exact description of the composition of the components used and the details of a manufacturer. Table 3 includes the examples 1 to 4 according to the invention and Table 4 comparative examples 5 to 9.

TABLE 1

| Components | Description | Trade name | Manufacturer |
|---|---|---|---|
| PA 6I/6T (A) | amorphous copolyamide 6I/6T made of hexamethylene diamine, isophthalic acid and terephthalic acid with amino end-group excess RV 1.42 (measured in 0.5% by weight of m-cresol solution at 20° C. glass transition temperature 125° C. amino end-groups 246 meq/kg | — | EMS-CHEMIE AG, Switzerland |
| PA 6I/6T (B) | amorphous copolyamide 6I/6T made of hexamethylene diamine, isophthalic acid and terephthalic acid with carboxyl end-group excess RV 1.52 (measured in 0.5% by weight of m-cresol | — | EMS-CHEMIE AG, Switzerland |

TABLE 1-continued

| Components | Description | Trade name | Manufacturer |
|---|---|---|---|
| | solution at 20° C.) glass transition temperature 125° C. amino end-groups 35 meq/kg | | |
| PA 6 | Polyamide 6 made of ε-caprolactam RV 1.80 (measured in 0.5% by weight of m-cresol solution at 20° C.) | — | EMS-CHEMIE AG, Switzerland |
| PA 66 | polyamide 66 made of hexamethylene diamine and adipinic acid RV 1.75 (measured in 0.5% by weight of m-cresol solution at 20° C.) | RADIPOL ® A 45 | Radici Chimica, Italy |

RV → relative viscosity

TABLE 2

| Composition | Description | MVR 275° C., 5 kg [ccm/10 min] | Trade name | Manufacturer |
|---|---|---|---|---|
| SEBS | styrene-ethylene/butylene-styrene block copolymer with 29% by weight of styrene, non-functionalised | 2 | KRATON ® G1650 ES | Kraton Performance Polymers Inc., |
| SEBS-MAH (C) | functionalised styrene-ethylene/butylene-styrene block copolymer with 30% by weight of styrene 1.8% by weight of maleic anhydride | 110 | SCONA ® TSKD 9103 GCT | Kometra Kunststoff Modifikatoren und Additiv GmbH, Germany |
| SEBS-MAH (D) | functionalised styrene-ethylene/butylene-styrene block copolymer with 30% by weight of styrene 1.7% by weight of maleic anhydride | 130 | KRATON ® FG1901X | Kraton Performance Polymers Inc., |
| GF-R (E) | glass fibres, round 4.7 mm long, diameter 13 μm | — | EC 13 720 4.7 mm | Johns Manville Slovakia |
| GF-R (F) | glass fibres, round 4.5 mm long, diameter 10 μm | — | 995 EC10-4.5 | Saint-Gobain Vetrotex France |
| GF-F | glass fibres, flat 3 mm long, main cross-sectional axis 28 μm subsidiary cross-sectional axis 7 μm aspect ratio of the cross-sectional axes = 4 | — | NITTOBO CSG3PA-820 | Nitto Boseki Co., LTD., Japan |
| carbon black master batch | colour black master batch based on polyethylene with 40% by weight of colour black. | — | EUTHYLEN ® Schwarz 00-6005 C4 | BASF Color Solutions, Germany |

TABLE 3

| | Unit | Examples | | | |
|---|---|---|---|---|---|
| | | 1 | 2 | 3 | 4 |
| Components | | | | | |
| PA 6I/6T (A) XE 3830 | % by weight | 34.5 | 34.5 | 35 | 34.5 |
| SEBS | % by weight | 17.25 | 17.25 | 22 | 17.25 |
| SEBS-MAH (C) | % by weight | 17.25 | 17.25 | 22 | 17.25 |
| carbon black master batch | % by weight | 1 | 1 | 1 | 1 |
| GF-R (E) | % by weight | 30 | — | — | — |
| GF-R (F) | % by weight | — | 30 | 20 | — |
| GF-F | % by weight | — | — | 30 | 30 |
| Tests | | | | | |
| modulus of elasticity in tension | MPa | 5160 | 4880 | 3220 | 4630 |
| breaking elongation | % | 7 | 8 | 12 | 7 |
| impact strength (Charpy) 23° C. | kJ/m$^2$ | 66 | 74 | 72 | 70 |
| notch impact strength (Charpy) 23° C. | kJ/m$^2$ | 19 | 23 | 30 | 35 |
| surface quality | — | 4 | 4 | 4 | 5 |
| soft-touch | — | 4 | 4 | 5 | 4 |

(A) → excess amino end-groups evaluation surface quality or soft-touch from 1 very poor to 5 very good

TABLE 4

|  | Unit | Comparative examples | | | | |
|---|---|---|---|---|---|---|
|  |  | 5 | 6 | 7 | 8 | 9 |
| Components |  |  |  |  |  |  |
| PA 6I/6T (B) | % by weight | 38.9 | — | — | — | — |
| PA 6 | % by weight | — | 34.5 | — | 9.7 | 23.3 |
| PA 66 | % by weight | — | — | 34.5 | — | — |
| SEBS | % by weight | 17.25 | 17.25 | 17.25 | 41.00 | — |
| SEBS-MAH (C) | % by weight | 17.25 | 17.25 | 17.25 | — | — |
| SEBS-MAH (D) | % by weight | — | — | — | 19.30 | 46.70 |
| carbon black master batch | % by weight | 1 | 1 | 1 | — | — |
| GF-R (E) | % by weight | 30 | — | — | — | — |
| GF-R (F) | % by weight | — | 30 | 30 | 30 | 30 |
| Tests |  |  |  |  |  |  |
| modulus of elasticity in tension | MPa | 4180 | 4870 | 3810 | 790 | 1050 |
| breaking elongation | % | 4 | 5 | 5 | 29 | 23 |
| impact strength, (Charpy) 23° C. | kJ/m$^2$ | 46 | 67 | 50 | kB | kB |
| notch impact strength, (Charpy) 23° C. | kJ/m$^2$ | 10 | 31 | 30 | kB | kB |
| surface quality | — | 2 | 3 | 2 | 2 | 2 |
| soft-touch | — | 4 | 3 | 2 | 2 | 2 |

(B) → excess carboxyl groups
kB → no breakage
evaluation surface quality or soft-touch from 1 very poor to 5 very good As emerges from Table 3, the test pieces produced with the polyamide moulding compounds according to the invention have, according to examples 1 to 4, superior properties, viewed respectively per se, with respect to the modulus of elasticity in tension in combination with a superior breaking elongation. It is essential with the test pieces which have been produced with a polyamide moulding compound according to the invention that all the test pieces have an above-average surface quality and excellent soft-touch. In Table 3, the soft-touch was thereby determined qualitatively and evaluated in a scale of 1 to 5. As emerges from Table 3, the test pieces which were produced with the moulding compound according to the invention have superior properties with respect to the surface quality and the soft-touch. All surfaces have been designated with 4 or 5. It must be stressed in particular that, despite the good surface quality and soft-touch, an above-average good breaking elongation in combination with a high modulus of elasticity in tension was achieved. The test pieces which were produced with the polyamide moulding compound according to the invention are hence distinguished not only by good physical properties i.e. by a high modulus of elasticity in tension and a high breaking elongation but also have at the same time still the required surface qualities and the soft-touch.

As emerges from the comparative examples (Table 4), the comparative examples designated there with 8 and 9 (cf. example III or IV of EP 0 771 846 B1) in fact have a very high breaking elongation (29 or 23%), however these test pieces then show a modulus of elasticity in tension which is only in the range of 790 or 1,050 MPa. The surface quality or the soft-touch is also significantly poorer (namely 2) than in the case of the test pieces according to the invention. The further comparative examples which have been designated with 5 to 7 likewise differ from the test pieces according to the invention as a result of the fact that their breaking elongation is significantly poorer, namely respectively at most 5% and that these test pieces, with respect to their surface quality and the soft-touch, also show merely unsatisfactory results.

As emerges from the comparative examples and the examples according to the invention, the moulded articles of the invention which were produced with a polyamide moulding compound according to the invention are hence distinguished by excellent physical properties in combination with good surface qualities.

The invention claimed is:

1. A polyamide moulding compound for producing moulded articles with a soft-touch surface comprising
   (a) 55 to 85% by weight of a blend of at least one polyamide (PA) with at least one styrene block copolymer as plasticiser,
      (a1) the polyamide being an amorphous polyamide which is amine-terminated, and
      (a2) the at least one plasticiser comprising at least one styrene-ethylene/butylene-styrene copolymer (SEBS) and at least one (SEBS) grafted with maleic anhydride (SEBS-MAH), and
      (a3) the weight ratio of polyamide to plasticiser being in the range of 1.25:0.75 to 0.75:1.25,
   (b) 15 to 45% by weight of a reinforcing material and
   (c) 0.1 to 10% by weight of an additive,
   the sum of the components (a)+(b)+(c) producing 100% by weight;
   wherein the weight ratio (a2) of SEBS to SEBS-MAH is 1:2 to 2:1.

2. The polyamide moulding compound according to claim 1, wherein the weight ratio (a3) of polyamide to plasticiser is 1.2:0.8 to 0.8:1.25.

3. The polyamide moulding compound according to claim 1, wherein the reinforcing material is contained in a quantity of 20 to 40% by weight.

4. The polyamide moulding compound according to claim 1, wherein the amorphous polyamide is amine-terminated and has a content of amino end-groups of at least 150 meq/kg.

5. The polyamide moulding compound according to claim 1, wherein the amorphous polyamide is selected from the group consisting of PA 6I/6T, PA 6I/10T, PA MACM14, PA MACM18 and mixtures or copolyamides thereof, wherein PA 6I/6T denotes a copolyamide made of hexamethylene diamine, isophthalic acid, and terephthalic acid; PA 6I/10T denotes a copolyamide made of hexamethylene diamine, decamethylene diamine, isophthalic acid, and terephthalic acid; PA MACM14 denotes a copolyamide made of bis-(4-amino-3-methyl-cyclohexyl)methane and tetradecanedioic acid; and PA MACM18 denotes a copolyamide made of bis-(4-amino-3-methyl-cyclohexyl)methane and octadecanedioic acid.

6. The polyamide moulding compound according to claim 1, wherein the reinforcing material is glass fiber.

7. The polyamide moulding compound according to claim 6, wherein the glass fiber has a round and/or a non-circular cross-section.

8. The polyamide moulding compound according to claim 1, wherein the additive is selected from inorganic stabilisers, organic stabilisers, lubricants, colourants, marking materials, inorganic pigments, organic pigments, IR-absorbers, antistatic agents, antiblocking agents, nucleation agents, crystallisation accelerators, crystallisation inhibitors, condensation catalysts, chain controllers, defoamers, chain-lengthening additives, conductivity additives, carbon black, graphite, carbon nanotubes, mould-release agents, parting agents, optical brighteners, adhesives, metal pigments, metal flakes, metal-coated particles, particle fillers, nanoscale fillers, natural phyllosilicates, synthetic phyllosilicates and mixtures thereof.

9. The polyamide moulding compound according to claim 8, wherein the colourant is carbon black.

10. A moulded article with a soft-touch surface produced or producible from a PA moulding compound according to claim 1.

11. The moulded article according to claim 10, wherein the moulded article is selected from housings, keys, grips and/or gripping surfaces for hand tools, household equipment, sports equipment, furniture components, electrical or electronic components and electrical and electronic devices.

12. A method for producing moulded articles with a soft touch surface comprising moulding the polyamide moulding compound according to claim 1.

13. The moulded article produced according to claim 10, wherein moulded article has a modulus of elasticity in tension, measured according to ISO 527, of greater than 2,500 MPa and at the same time a breaking elongation according to ISO 527, of greater than 6%.

14. The polyamide moulding compound according to claim 1, wherein the weight ratio (a3) of polyamide to plasticiser is 1.15:0.85 to 0.85:1.15.

15. The polyamide moulding compound according to claim 1, wherein the weight ratio (a2) of SEBS to SEBS-MAH is 1:1.5 to 1.5:1.

16. The polyamide moulding compound according to claim 1, wherein the reinforcing material is contained in a quantity of 25 to 35% by weight.

17. The polyamide moulding compound according to claim 2, wherein the reinforcing material is contained in a quantity of 20 to 40% by weight.

18. The polyamide moulding compound according to claim 2, wherein the amorphous polyamide is amine-terminated and has a content of amino end-groups of at least 150 meq/kg.

* * * * *